No. 856,307. PATENTED JUNE 11, 1907.
J. G. SMITH.
WIRE WORKING MACHINE.
APPLICATION FILED JULY 25, 1904.

5 SHEETS—SHEET 2.

Witnesses
W. A. Alexander
Fred Henke.

Inventor
John G. Smith.
By Attorneys
Fowler & Bryan

No. 856,307. PATENTED JUNE 11, 1907.
J. G. SMITH.
WIRE WORKING MACHINE.
APPLICATION FILED JULY 25, 1904.
5 SHEETS—SHEET 3.
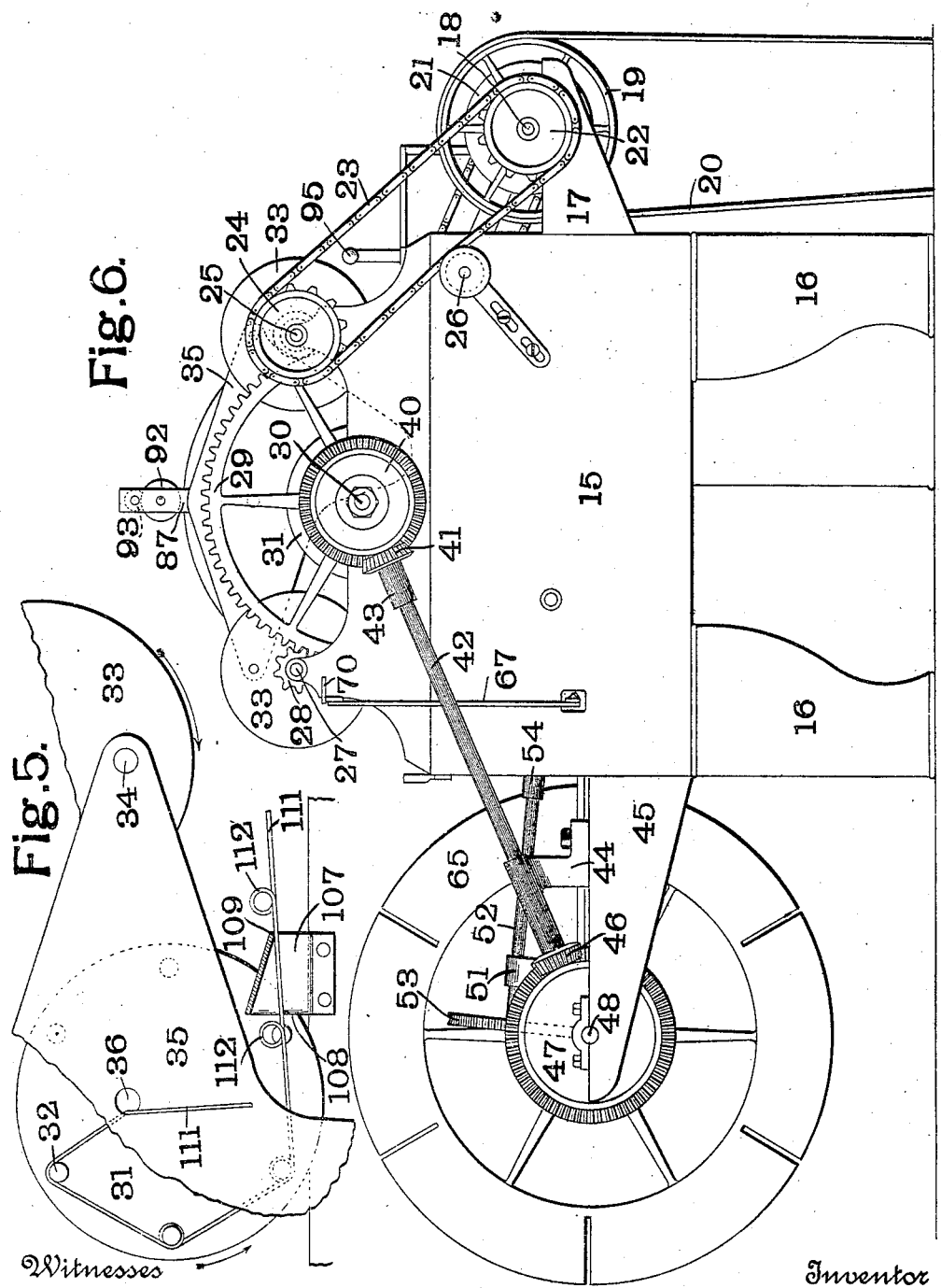

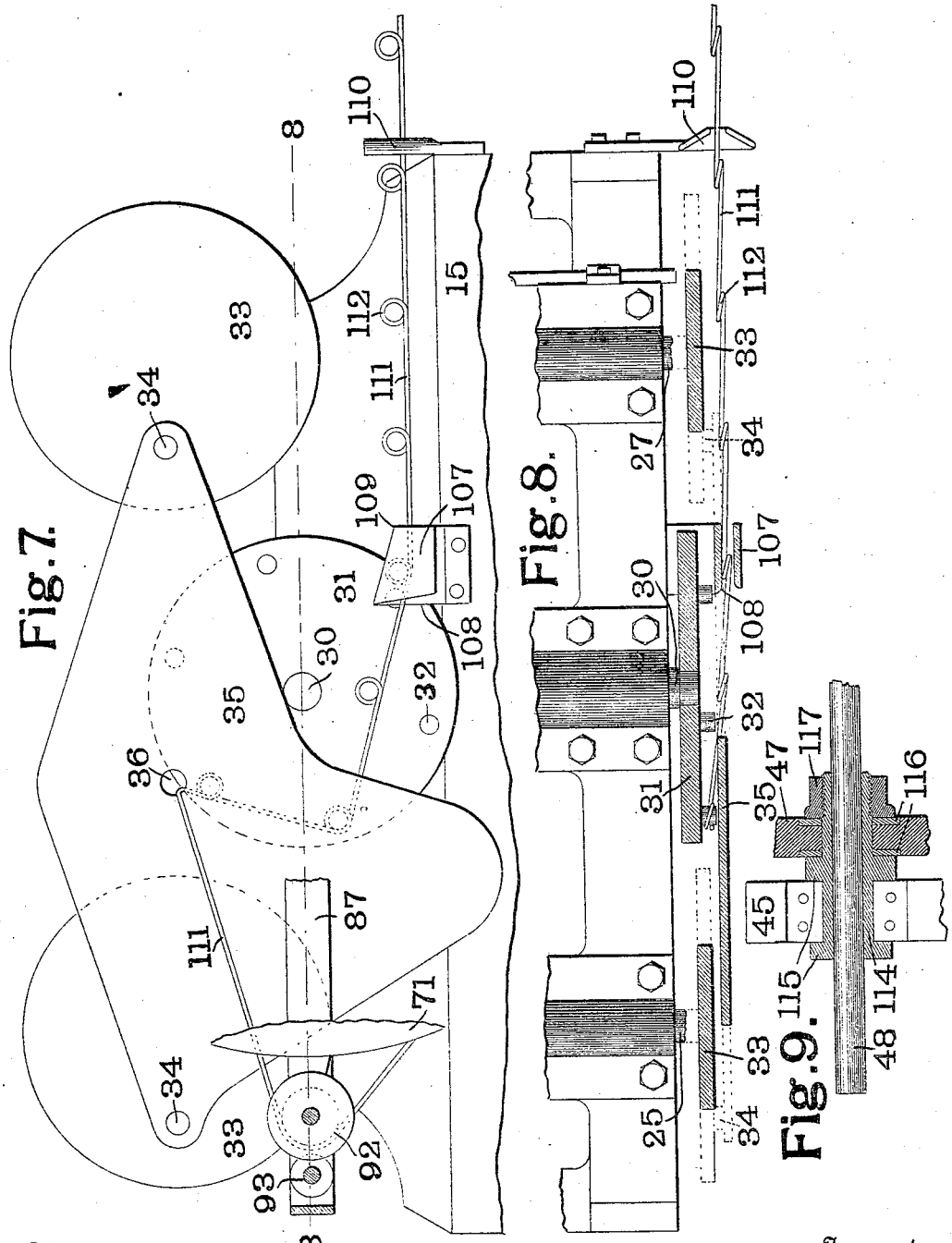

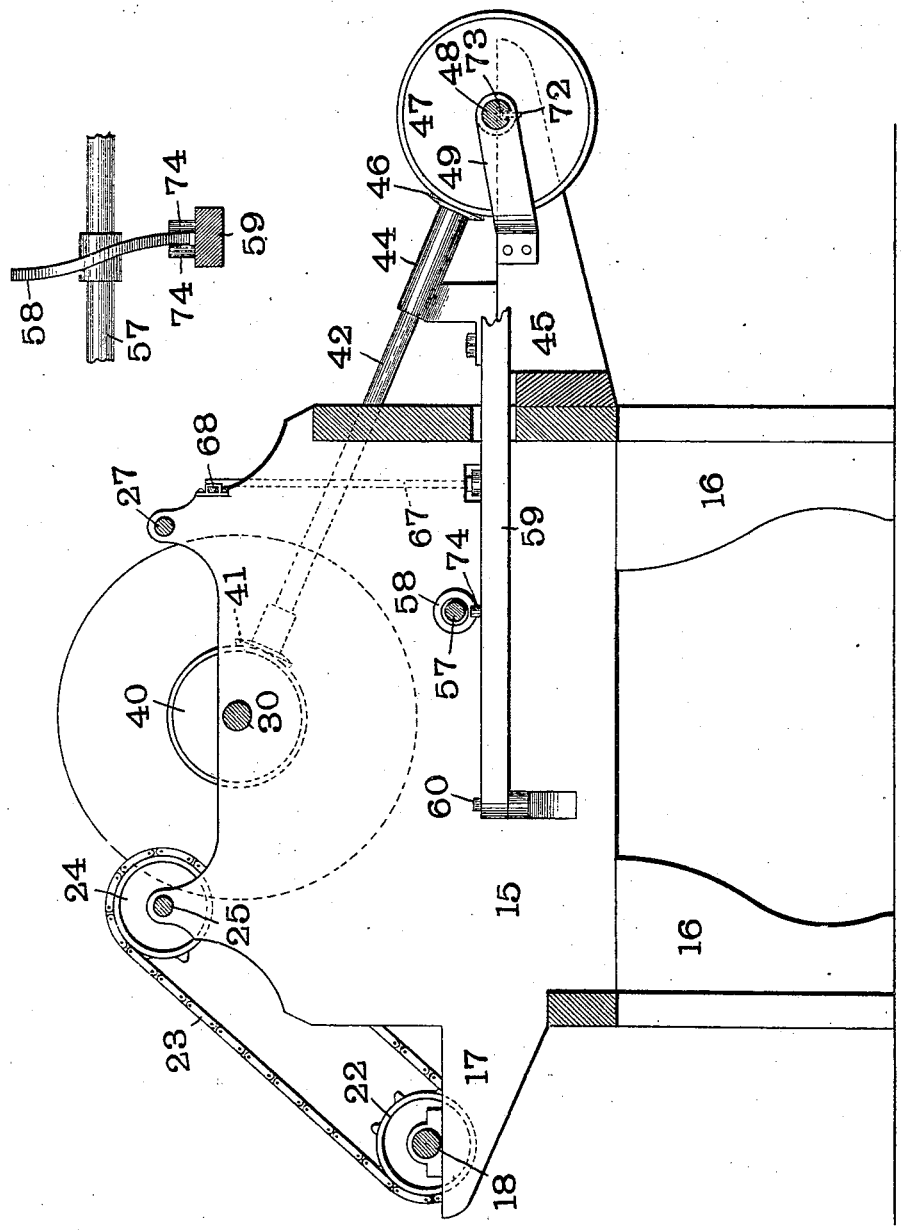

UNITED STATES PATENT OFFICE.

JOHN G. SMITH, OF CHICAGO HEIGHTS, ILLINOIS.

WIRE-WORKING MACHINE.

No. 856,307.      Specification of Letters Patent.      Patented June 11, 1907.

Application filed July 25, 1904. Serial No. 217,960.

*To all whom it may concern:*

Be it known that I, JOHN G. SMITH, a citizen of the United States, residing at the city of Chicago Heights, county of Cook, State of Illinois, have invented a certain new and useful Wire-Working Machine, of which the following is such a full, clear, and exact description as will enable any one skilled in the art to which it appertains to make and use the same, reference being had to the accompanying drawings, forming part of this specification.

My invention relates to a wire working machine, and more particularly to a machine for forming loops at intervals in a strand of wire.

The object of my invention is to provide a machine of the class above referred to which will be rapid and effective in operation, and which will handle the wire with the least possible manual labor.

Having the above objects in view, my invention consists in part in the arrangement of the wire reel which delivers the wire to the wrapping device, so that it will remain in the same center of rotation, thus avoiding the planetary movement of the wire reel, such as has been used in all prior machines of this class of which I am aware.

My invention also consists in part in the use of a guide plate for wrapping the wire around the pin, said guide plate having a translatory movement.

My invention also consists in part in the use of a plurality of pins, which are successively brought into position to cooperate with the loop forming device.

My invention also consists in various other novel features and details of construction, all of which are described in the following specification and pointed out in the claims affixed hereto.

Figure 1:
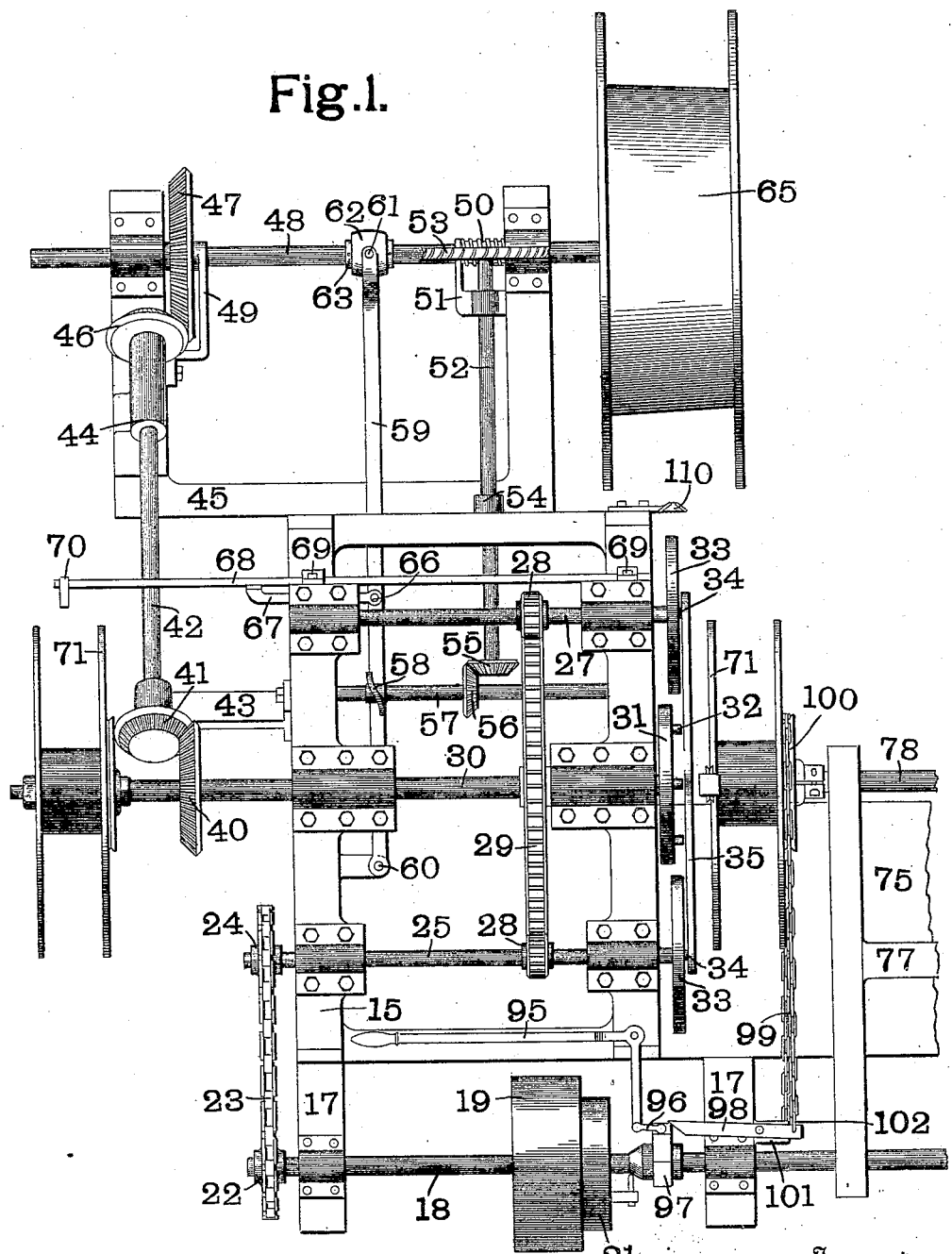
Figure 2:
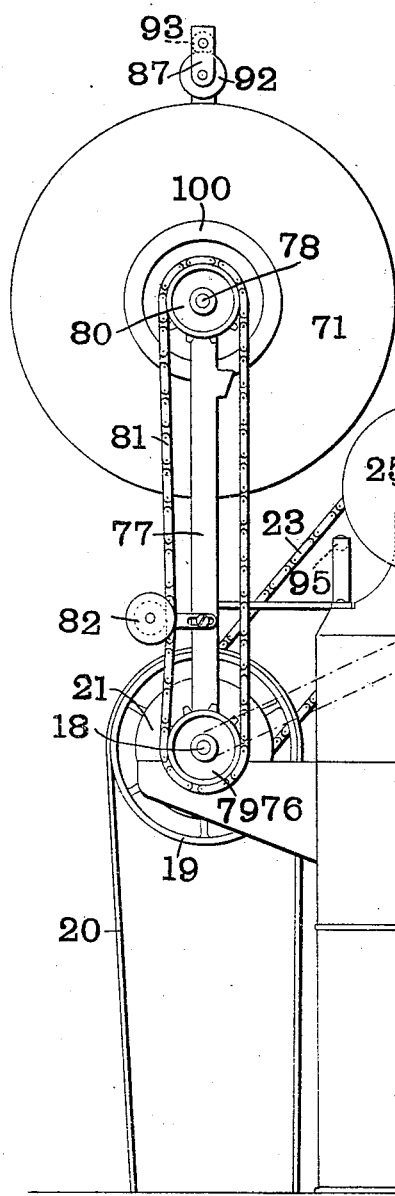
Figure 3:
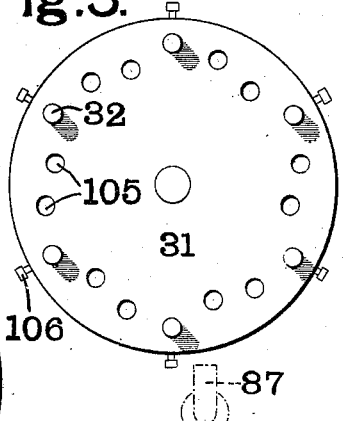
Figure 4:
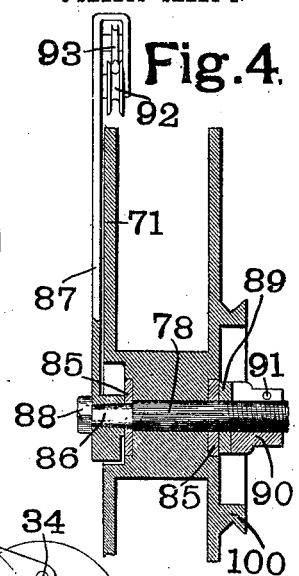

In the accompanying drawings, which illustrate one form of machine made in accordance with my invention, Figure 1 is a top plan view, part of the machine being broken away; Fig. 2 is a side elevation, part of the machine being broken away; Figs. 3, 4 and 5 are enlarged detailed views; Fig. 6 is a side elevation looking at the opposite side of the machine from Fig. 2; Fig. 7 is an enlarged view showing the manner of forming the loops in the wire; Fig. 8 is partly a top plan view of the parts shown in Fig. 7, and partly a section on line 8—8 of Fig. 7; Fig. 9 is an enlarged detail view of a modification; Fig. 10 is a vertical section, and Fig. 11 is an enlarged view showing a detail of construction.

Like marks of reference refer to similar parts in the several views of the drawings.

15 is the main frame of the machine, which is supported on feet 16. Projecting from the front end of the frame 15 are brackets 17, in which is journaled a shaft 18. Loosely mounted on the shaft 18 is a driving-wheel 19, which may be operated by a belt 20, or any other suitable manner. The driving-wheel 19 is connected with the shaft 18 by means of a friction clutch 21, which is operated by means which will be more fully hereinafter described. Mounted on the end of the shaft 18 is a sprocket wheel 22. This sprocket wheel 22 is connected by means of a sprocket chain 23 with a sprocket wheel 24 mounted on the end of a shaft 25 journaled in the main frame 15 of the machine. 26 is an adjustable idle wheel, by means of which the sprocket chain 23 is tightened. Journaled at the opposite end of the main frame 15 from the shaft 25 is a similar shaft 27. On each of the shafts 25 and 27 is a pinion wheel 28. These pinion wheels 28 mesh with a spur wheel 29 mounted on a main shaft 30 of the machine. Mounted at one end of this main shaft 30 is a disk 31, carrying pins 32, around which the wire is coiled to form the loops therein. Secured to the ends of the shafts 25 and 27 are disks 33, which have crank connection at points 34 with a plate 35, which I term a "guide plate."

It will be evident from this construction that the disk 31 will be rotated in one direction while the disks 33 will impart to the guide plate 35 a translatory motion in the opposite direction, as indicated by the arrows in Fig. 5. Formed in the plate 35 is an opening 36 through which the wire passes to the pins 32. The proportion of the spur wheel 29 and the pinion wheels 28 is such that the plate 35 will be rotated once for each pin in the disk 32 during one complete revolution of the shaft 30.

In the form shown in the drawings there are 6 pins in the disk 31, and consequently the guide-plate 35 will perform 6 revolutions to one revolution of the disk 31. The guide-plate 35, in addition to wrapping the wire around the pins 32, is placed close to the ends of the pins 32 so as to prevent the premature disengagement of the loops from the pins, as will more fully be hereinafter described.

Secured to the shaft 30 at the opposite side of the machine from the disk 31 is a bevel gear wheel 40. This bevel gear wheel 40 in turn meshes with a gear wheel 41 secured to the end of a shaft 42. The shaft 42 is supported by a pair of brackets 43 and 44 respectively. The bracket 43 is secured to the main frame 15 of the machine, and the bracket 44 is supported on an auxiliary frame 45 secured to the end of the main frame 15. The opposite end of the shaft 42 has secured to it a bevel gear wheel 46, which meshes with a bevel gear wheel 47. The bevel gear wheel 47 is mounted on a shaft 48. This wheel 47 is provided with a spline or leather 72 as best shown in Fig. 10, which spline engages with a groove 73 in the shaft 48 so that the shaft is capable of longitudinal movement independent of the gear wheel 47 but cannot be rotated independently thereof.

The gear wheel 47 is prevented from lateral movement by means of a bracket 49 secured to the auxiliary frame 45. It will be evident from this that the rotation of the gear wheel 47 will rotate the shaft 48, but that the shaft 48 will have longitudinal movement independent of said gear wheel 47. In order to move the shaft 48 longitudinally, I provide it with a worm 50. This worm 50, like the gear wheel 47, is arranged to allow longitudinal movement of the shaft 48, but to be incapable of rotation independent of the shaft. The worm 50 is prevented from lateral movement by a bracket 51 carried by the auxiliary frame 45. This bracket 51 also has journaled in it one end of a shaft 52. Secured to this shaft 52 is a worm wheel 53, which meshes with the worm 50. The opposite end of the shaft 52 is journaled at 54 in the rear end of the main frame 15, and has secured to it a bevel gear wheel 55, which meshes with a bevel gear wheel 56 on a shaft 57. This shaft 57 is provided with a cam 58, which co-operates with an arm 59 pivoted at 60 to a lug carried by the main frame 15. The cam 58 imparts a reciprocating movement to the arm 59, and this movement is in turn communicated to the shaft 48 by the bifurcated end of said arm which is pivoted at 61 to a collar 62 loosely mounted on the shaft 48. The movement of the cam 58 is communicated to the arm 59 by means of pins or rolls 74 which are carried by said arm and engaged with said cam as best shown in Figs. 10 and 11. The collar 62 is prevented from lateral movement independent of the shaft 48 by means of collars 63 rigidly secured to said shaft.

Frictionally mounted on the end of the shaft 48 is a reel 65, which is adapted to receive the wire from the wrapping devices after the loops have been formed therein. Pivoted to the arm 59 at 66 is an L-shaped member 67 attached at one end to a bar 68, sliding in guides 69 secured to the rear end of the main frame 15. This bar 68 is provided with a wire guide 70, through which the wire is fed to a wire reel 71 secured on the end of the shaft 30.

75 is a lateral extension of the main frame 15. This extension 75 is provided with a bracket 76, which supports the end of the shaft 18. Journaled on this shaft is a swinging frame 77, carrying a shaft 78. Secured to the end of the shaft 18 is a sprocket wheel 79, and to the end of the shaft 78 a sprocket wheel 80. These sprocket wheels are connected by a sprocket chain 81.

82 is an adjustable idle wheel for tightening the sprocket chain 81. The swinging frame 77 when in its normal position rests upon pillars 83 carried by the lateral extension 75 of the main frame. When in this position the shaft 78 is substantially in line with the upper pin 32 on the disk 31. The object of having the frame 78 swing is that it can be moved into the position shown in full lines in Fig. 2, to allow the removal or insertion of the wire reel 71. The wire reel 71 after being filled on the end of the shaft 30 is secured on the end of the shaft 78, in order to feed the wire to the wire wrapping device. The shaft 78 passes through the hub of the reel 71 and is surrounded by a pair of disks 85, one at each end of said hub. These disks 85 are made of fiber or some other material which will stand considerable wear, as they are used to frictionally hold the reel 71 upon the shaft 78. The shaft 78 is provided with a conical end 86, which engages with a guide arm 87. The arm is rigidly held in engagement with the conical end 86 of the shaft by means of a nut 88. Bearing against the inner washer 85 is a washer 89 of rubber or other yielding material. This washer 89 is held in position by means of an internally threaded split collar 90. This collar 90 is threaded on the shaft 78 and is provided with a locking bolt 91, by means of which it is clamped in position after suitable tension is brought to bear against the washer 85.

In the construction just described the reel 71 is frictionally mounted on the shaft 78 so as to insure the proper tension on the wire as it passes from the reel to the loop forming devices. When the wire passes from the loop forming devices to the reel 65 its tension is insured in the same manner, the reel 65 being mounted on its shaft 48 in a manner similar to the mounting of the reel 71 on the shaft 78.

As the method of mounting the two reels is similar no separate illustration and description of the mounting of the reel 65 is deemed necessary. While the mounting of the two reels is similar the manner of securing the tension is somewhat different. In case of the reel 65 the tension is secured by the rotation of the reel, its peripheral speed being such as to tend to wind the wire on to the reel more rapidly than it is delivered from the machine. The consequent slipping between the reel and the shaft 48 furnishes the tension. In the reel 71, on the contrary, the rotation of the reel does not tend to wind the wire either on or off the reel because the arm 87 normally rotates in unison with the reel. The feed of the wire to the machine, however, tends to move the reel either faster or slower than the shaft 78 and the consequent friction between the reel and the shaft causes the tension. If the wire is wound on the reel in the direction as shown in Fig. 7 of the drawing the feed of the wire will cause the reel to rotate faster than the shaft 78. This, however, is immaterial and the wire may be wound in the opposite direction so as to cause the reel to rotate slower than the shaft.

The arm 87 is provided with a grooved guide wheel 92 and with a small wheel 93, which runs in the grooved wheel 92. The wire from the wheel 71 passes between the wheels 92 and 93, and thence to the guide-plate 35 hereinbefore described.

95 is an L-shaped lever, which is pivoted to the main frame 15 connected by a link 96 with an arm 97 for operating the friction clutch 21 hereinbefore mentioned. This arm 97 co-operates with the inclined end of a lever 98 pivoted to one of the brackets 17. The opposite end of the lever 98 is connected at one end to a chain 99, which passes around a brake wheel 100 on the wire reel 71, and has its opposite end attached to a lug 101 projecting from the said bracket 17. The object of this arrangement is to stop the movement of the wire reel 71 when the machine is thrown out of operation, as will be more fully hereinafter described. The end of the chain 99 is not permanently attached to the lever 98, but is secured thereto by means of a hook 102, so that the said chain may be detached when the frame 78 is swung up into the position shown in Fig. 2.

In the main views of the drawings I have shown the disk 31 as provided with six permanent pins 32. In practice, however, I prefer to make the disk as shown in Fig. 3. As shown in this figure I provide the disk with a number of sets of holes 105 for receiving the removable pins 32. These sets of holes 105 are arranged at different distances from the center of the disk, so that by changing the pins from one set of holes to another the distance between the loops in the wire can be varied. The pins 32 are held in position by means of set screws 106. In order to remove the loops from the pins 32 after they have been formed thereon, I provide the machine with a loop-removing guide 107, best shown in Figs. 5, 7 and 8. This loop-removing guide 107 is U-shaped, so that the strand of wire will pass between the two sides thereof, as best shown in Fig. 8. It is situated at such a distance from the disk 31 that as the wire passes between the two sides of the guides the loops will be drawn from the pins 32 by the lateral movement imparted to the wire. The inner side of the guide is provided with a round or beveled edge 108 against which the wire bears when passing into the guide. As has been hereinbefore described the reel 65 is frictionally driven on the shaft 48, and thus insures sufficient tension on the wire 111 to cause it to bear against the curved edge 108 of the guide 107, and thus insures the loops 112 being lifted from the pins 32. The upper part of the guide is inclined so as to form at the rear and top edge a bearing 109, which holds the wire down as the loops are entering the guide, and thus prevents the loops from catching on the front part of the guide as might otherwise occur. Behind the guide 107 is a second guide 110 from which the wire passes to the wire reel 65 hereinbefore described. 111 represents the wire, and 112 the loops formed therein by wrapping the wire around the pins 32.

The operation of my machine is as follows: Wire is first wound onto one of the wire reels 71 by placing same on the end of the shaft 30. The wire is guided to the reel by means of a wire guide 70, and at the same time the wire having the loops formed therein is wound onto the reel 65, the reel itself having lateral movement so that the wire is wound thereon in regular layers. When the reel 71 is filled with wire the frame 77 is swung up into the position shown in Fig. 2 and the empty reel 71 is removed from the end of the shaft 78 and the full reel 71 substituted therefor. The end of the wire 111 from the full reel 71 is now passed between the wheels 92 and 93, thence through the opening 36 in the guide-plate 35, and thence through the guides 107 and 110 to the wire reel 65. The machine is now started in operation and the wire 111 is wrapped around the pins 32 by means of the guide-plate 35. As has been hereinbefore described, this guide-plate has imparted to it a translatory movement by the disks 33. At the same time the arm 87 operates in harmony with the guide-plate and supplies the wire thereto in such a manner as to prevent all twisting of the wire. The disk 31 is rotated so as to bring one pin after another substantially in line with the shaft 78 so that the wire can be properly wrapped around the various pins. It will be understood that as the disk 31, and consequently the pins 32, are in constant motion the pin upon which the wire is being wrapped can only be absolutely in line with the shaft 78 at one point; but as the movement of the disk is slow relative to the movement of the plate 35, the pin is approximately in line with the shaft during the entire time the wire is wrapped thereon—i. e. it is near enough in line to allow the wire to be wrapped around the pin without any planetary movement of the wire reel 71, this reel having no movement but a rotary movement on its axis. The friction between the reel 71 and its shaft 78 provides the necessary tension for insuring the wire being tightly wrapped around the pins 32. As the loop 112 in the wire approaches the guide 107 the parts will be in the position shown in Fig. 5. It will be evident that the bearing face 109 will hold the wire in such position that the loop 112 will not catch on the front end of the guide. After the loop 112 has entered the guide 107 the plate 35 will then uncover the succeeding pin, and the lateral movement of the wire caused by the guide 107 will withdraw the loop so that the parts will assume the position shown in Fig. 7. When the machine is stopped, especially if the reel 71 is nearly full of wire, it will have considerable momentum and will be liable to rotate for a short time after the machine stops, and thus unwind wire which might become entangled in the machine. In order to prevent this I provide the reel 71 with the brake wheel 100 as hereinbefore described. When the machine is thrown out of operation by the movement of the handle 95 the chain 99 will be drawn taut around the brake wheel 100, and thus stop the reel 71 at the same time as the machine and prevent entangling of the wire.

In the modification shown in Fig. 9 the shaft 48 is not directly connected with the gear wheel 47, but is splined in a sleeve 114, which is journaled in the frame 45. Surrounding this sleeve 114 is the bevel gear wheel 47. The sleeve 114 is provided with a pair of collars 115, one arranged at each side of the frame 45. 116 are two washers of fiber or other similar material, one of which is placed at each side of the wheel 47. One of these washers bears against one of the collars 115, and the other bears against a nut 117 threaded on the end of the sleeve 114. By tightening the nut 116 the friction between the gear wheel 47 and the sleeve 114 can be regulated. In connection with this construction the wire reel 65 may be rigidly connected to the shaft 48, and it will be frictionally driven in the same manner as heretofore described, except that it will rotate the same number of times as the shaft 48, with the advantage that the wire will be more uniformly wound upon the said wheel 65.

Having fully described my invention, what I claim as new, and desire to secure by Letters Patent of the United States, is 1. In a wire working machine, the combination with a wire reel normally remaining in the same center of rotation, of a pin situated approximately in line with the axis of said wire reel, and means for wrapping the wire upon said reel around said pin to form loops.

2. In a wire working machine, the combination with a pin, of a guide-plate for wrapping wire around said pin to form a loop and prevent the premature displacement of the loop from said pin, and means for feeding the wire to said plate.

3. In a wire working machine, the combination with a wire reel normally remaining in the same center of rotation, of a pin situated approximately in line with the axis of said reel, and a guide-plate for wrapping the wire from said reel around said pin to form loops.

4. In a wire working machine, the combination with a plurality of pins, of a wire wrapping device adapted to wrap wire around said pins to form complete loops, means for bringing said pins successively into co-operation with said wire wrapping device, and feeding devices for supplying wire to said wire wrapping device.

5. In a wire working machine, the combination with a guide-plate for wrapping the wire, of a plurality of pins, means for bringing said pins successively into co-operation with said guide-plate, and means for feeding wire to said guide-plate.

6. In a wire working machine, the combination with a wire reel normally remaining in the same center of rotation, of a plurality of pins, means for successively bringing said pins approximately in line with the axis of said reel, and means for wrapping the wire from said reel around said pins to form loops.

7. In a wire working machine, the combination with a wire reel normally remaining in the same center of rotation, of a plurality of pins, means for successively bringing said pins approximately in line with the axis of said reel, and a guide-plate for wrapping the wire around said pins.

8. In a wire working machine, the combination with a wire wrapping device, of a rotary member, a plurality of pins carried by said rotary member, gearing for rotating said rotary member to bring said pins successively into co-operation with said wire wrapping device, and a feeding device for supplying wire to said wire wrapping device.

9. In a wire working machine, the combination with a guide-plate for wrapping the wire, a rotary member, a plurality of pins carried by said rotary member, gearing for rotating said member to bring said pins successively into co-operation with said plate, and means for feeding wire to said plate.

10. In a wire working machine, the combination with a wire reel normally remaining in the same center of rotation of a rotary member, a plurality of pins carried by said rotary member, gearing for rotating said member to bring said pins successively into co-operation with said wire reel, and means for wrapping the wire from said reel around said pins to form loops.

11. In a wire working machine, the combination with a wire reel normally remaining in the same center of rotation, of a rotary member, a plurality of pins carried by said rotary member, gearing for rotating said member to successively bring said pins approximately in line with the axis of said reel, and a guide-plate for wrapping the wire from said reel around said pins.

12. In a wire working machine, the combination with a pin, of a guide-plate for the wire, means for imparting to said guide-plate a translatory movement around said pin, and means for supplying wire to said guide plate.

13. In a wire working machine, the combination with a pin, of a guide-plate for the wire, means for imparting to said guide-plate a translatory movement around said pin, and a wire reel normally remaining in the same center of rotation and supplying wire to said guide plate.

14. In a wire working machine, the combination with a guide-plate for the wire, of means for imparting to said plate a translatory movement, a plurality of pins, means for bringing said pins successively into co-operation with said guide-plate, and a feeding device for supplying wire to said guide-plate.

15. In a wire working machine, the combination with a guide-plate for the wire, of means for imparting to said guide-plate a translatory movement, a rotary member, a plurality of pins carried by said rotary member, gearing for rotating said rotary member to bring said pins successively into co-operation with said guide-plate, and a feeding device for supplying wire to said guide-plate.

16. In a wire working machine, the combination with a rotary member, of a plurality of pins carried by said member, gearing for rotating said member, a guide for wrapping the wire around said pins to form loops, and means for imparting to said guide-plate a translatory movement contrary in direction to the movement of said rotary member.

17. In a wire working machine, the combination with a pin, of a guide-plate for wrapping the wire around said pin, a wire reel normally remaining in the same center of rotation, and a guide-arm moving in harmony with said guide-plate and guiding the wire in said reel to said plate.

18. In a wire working machine, the combination with a pin, of a guide-plate for wrapping the wire around said pin, a wire supply, a guide-arm for guiding the wire from said supply to said guide-plate, and gearing for positively moving said arm in harmony with said guide-plate.

19. In a wire working machine, the combination with a pin, of a guide-plate for wrapping the wire around said pin, a shaft, a guide-arm carried by said shaft, means for rotating said shaft in harmony with said guide-plate, and a wire reel frictionally mounted on said shaft.

20. In a wire working machine, the combination with a rotary member, of a plurality of pins carried by said rotary member, gearing for rotating said rotary member, a guide-plate for wrapping the wire around said pins to form loops, means for imparting to said guide-plate a translatory movement contrary in direction to the movement of said rotary member, a shaft, a guide-arm carried by said shaft, and gearing for rotating said shaft to move said arm in harmony with said plate.

21. In a wire working machine, the combination with a rotary member, of a plurality of pins carried by said rotary member, gearing for rotating said rotary member, a guide-plate for wrapping the wire around said pins to form loops, means for imparting to said guide-plate a translatory movement contrary in direction to the movement of said rotary member, a shaft, a guide-arm carried by said shaft, gearing for rotating said shaft to move said arm in unison with said plate, and a wire reel frictionally mounted on said shaft.

22. In a wire working machine, the combination with a pin, of a guide-plate for wrapping the wire around said pin, a shaft, a guide-arm carried by said shaft, means for rotating said shaft in harmony with said guide-plate, a wire reel frictionally mounted on said shaft, and a brake for said wire reel.

23. In a wire working machine, the combination with a pin, of wire wrapping devices for wrapping the wire around said pin to form loops, a shaft, gearing for rotating said shaft, a wire reel frictionally mounted on said shaft for supplying wire to said wire wrapping devices, power controlling devices for the machine, and a brake for said wire reel operated by said power controlling devices.

24. In a wire working machine, the combination with a pin, of wire wrapping devices for wrapping the wire around said pin to form loops, a swinging frame, and a wire reel carried by said frame for supplying the wire to said wire wrapping devices.

25. In a wire working machine, the combination with a pin, of wire wrapping devices for wrapping the wire around said pin to form loops, a swinging frame, a shaft carried by said frame and adapted to swing approximately in line with said pin, and a wire reel mounted on said shaft to supply wire to said wire wrapping devices.

26. In a wire working machine, the combination with a pin, of a guide-plate for wrapping wire around said pin to form loops, and a guide for removing said loops when said pin is uncovered by said guide-plate.

27. In a wire working machine, the combination with a plurality of pins adapted to have loops formed thereon, means for moving said pins, means for covering said pins during part of their movement, and a wire guide for removing the loops from the uncovered pins.

28. In a wire working machine, the combination with a plurality of pins, of a guide-plate for wrapping the wire around said pins, means for moving said pins to bring them successively into co-operation with said guide-plate, and a wire guide for removing the loops from said pins when they are uncovered by said guide-plate.

In testimony whereof, I have hereunto set my hand and affixed my seal, in the presence of the two subscribing witnesses.

JOHN G. SMITH. [L. S.]

Witnesses:
FRED HEUKE,
D. C. BETJEMAN.